United States Patent
Deptolla

[11] Patent Number: 5,884,972
[45] Date of Patent: Mar. 23, 1999

[54] LATCHING DEVICE FOR LOCKING BACKREST OF TILT-ADJUSTABLE MOTOR VEHICLE SEAT

[75] Inventor: Bernd Deptolla, Niedernwöhren, Germany

[73] Assignee: Bertrand Faure Sitztechnik GmbH & Co. KG, Stadthagen, Germany

[21] Appl. No.: 987,284

[22] Filed: Dec. 9, 1997

[30] Foreign Application Priority Data

Dec. 18, 1996 [DE] Germany ......................... 196 52 665.5

[51] Int. Cl.⁶ ....................................................... B60N 2/42
[52] U.S. Cl. ................................... 297/378.11; 297/216.14
[58] Field of Search ......................... 297/216.13, 216.14, 297/367, 378.1, 378.11, 378.12

[56] References Cited

U.S. PATENT DOCUMENTS

| | | | |
|---|---|---|---|
| 4,707,010 | 11/1987 | Croft et al. | 297/378.11 |
| 4,997,223 | 3/1991 | Croft | 297/367 |
| 5,346,281 | 9/1994 | Hughes | 297/378.11 X |
| 5,507,553 | 4/1996 | Nishizawa et al. | 297/216.14 X |

FOREIGN PATENT DOCUMENTS

| | | | |
|---|---|---|---|
| 2238899 | 2/1974 | Germany . | |
| 2708461 | 8/1978 | Germany | 297/378.11 |
| 3701419 | 7/1988 | Germany | 297/378.11 |

*Primary Examiner*—Peter R. Brown
*Attorney, Agent, or Firm*—Flanagan & Flanagan; John R. Flanagan; John K. Flanagan

[57] ABSTRACT

A latching device provides locking of the backrest of a tilt-adjustable seat in a motor vehicle against undergoing pivotal movement in response to the motor vehicle exceeding a predetermined acceleration value in the longitudinal direction of the motor vehicle. The latching device includes an internal-toothed annular member on a backrest-secured part of a seat articulation which pivotally mounts the backrest to a seat part of the seat, an eccentric inertial weight pivotally supported on a pivot axle of the seat articulation pivotally mounting the backrest-secured part to a seat-secured part of the seat articulation, at least one stop on the inertial weight spaced from the pivot axle, and two locking pawls pivotally supported at least at one center of rotation disposed on the seat-secured part of the seat articulation and having tooth segments capable of lockably engaging with the internal-toothed annular member. At normal acceleration values the locking pawls are held under the action of a spring out of engagement with the internal-toothed annular member. Above a predetermined high acceleration value, such as occurs during a crash, the inertial weight pivots about the pivot axle pressing at least one of the tooth segments of one of the locking pawls into locking engagement with the internal-toothed annular member, thereby securing the backrest from undergoing pivotal movement responding to the occurrence of the high acceleration value.

15 Claims, 5 Drawing Sheets

LATCHING DEVICE FOR LOCKING BACKREST OF TILT-ADJUSTABLE MOTOR VEHICLE SEAT

BACKGROUND OF THE INVENTION

1. Field of the Invention

The present invention relates to a tilt-adjustable motor vehicle seat of the type in which a backrest of the seat is connected with a seat part of the seat via bilateral articulations including a first articulation part secured stationarily on the seat, a second articulation part secured stationarily on the backrest, and a pivot axle disposed between and pivotally coupling the articulation parts together. More particularly, the present invention relates to a latching device for locking the backrest relative to the seat part in response to the motor vehicle exceeding a predetermined acceleration value acting in the longitudinal direction of the motor vehicle.

2. Description of the Prior Art

The articulations between a seat part of a motor vehicle seat and its backrest whose inclination can be adjusted relative to the seat part are implemented as inclination adjustment fittings. For the pure function of adjustment of the angle of inclination an adjustment fitting disposed on one of the sides of the seat is entirely sufficient. At normal vehicle acceleration or at normal seat loading through the passenger, this one adjustment fitting secures the backrest securely in the adjusted angle of inclination. In the event of a crash in which very high negative or positive accelerations occur, the backrest of a seat equipped in this way would unavoidably "slide through", i.e. the adjustment fitting could not absorb the large forces and shunt them into the seat frame.

For this reason motor vehicle seats are conventionally built with one adjustment fitting on each seat side. In order to attain synchronous adjustment, the two fittings are coupled with one another through a shaft. In the case of motor vehicle seats integrated with belts, the adjustment fitting on the one seat side where the belt member is integrated into the backrest frame must be implemented especially strong since the retaining forces of the integrated belt carried on the seat must be intercepted in the seat itself, i.e. by its frame construction, which forces are carried off therefrom into the motor vehicle floor. The articulations between the backrest and the seat part represent a substantial member in the chain of diversion of force.

German patent document No. DE-OS 22 38 899 discloses a safety locking mechanism in particular for a reclining seat fitting of a motor vehicle seat. This fitting comprises a first fitting part fixedly disposed on the seat frame and a second fitting part disposed on the seat backrest and articulated with the first fitting part through a pivot axle. Both fitting parts are adjustable relative to one another by means of a latching arrangement. This latching arrangement comprises a pinion, rotatably supported on the first fitting part secured stationarily on the seat frame, which engages an internal teething disposed concentrically to the pivot axis. On the pinion axle extending parallel to the pivot axis and on the second fitting part is seated a toothed wheel which can be locked by an arresting lever. In the locked position, the first and second fitting parts cannot be pivoted toward one another. Also on the pinion axle parallel to the toothed wheel is seated a locking wheel with which is associated at least one locking pawl articulated on the first fitting part secured on the seat frame, which through inertia can be made to engage the locking wheel. Thereby the seat backrest is said to be blocked even with the latching device disengaged during strong accelerations.

The above-described arrangement has several drawbacks. It comprises a relatively large number of structural members and for that reason is disturbance-prone. Furthermore, it is neither suitable for replacing an adjustment fitting on a seat side nor can it be used for reinforcing an adjustment fitting.

SUMMARY OF THE INVENTION

The present invention overcomes the aforementioned drawbacks by providing a latching device which permits replacement of an adjustment fitting on a seat side and additionally one which can be used for reinforcement of an adjustment fitting. The latching device of the present invention is structured relatively simply so that compared to an adjustment fitting, a cost advantage can be expected.

Accordingly, the present invention is directed to a latching device for a tilt-adjustable motor vehicle seat of the type in which a backrest of the seat is connected with a seat part of the seat via an articulation having a first articulation part secured stationarily on the seat, a second articulation part secured stationarily on the backrest, and a pivot axle disposed between and pivotally coupling the first and second articulation parts together. The latching device is operable for locking the backrest of the seat relative to the seat part of the seat in response to the motor vehicle exceeding a predetermined acceleration value acting in the longitudinal direction of the motor vehicle.

The latching device comprises: an internal-toothed annular member disposed on the first, backrest-secured articulation part; an eccentric inertial weight pivotally supported on the pivot axle; at least one stop on the inertial weight spaced from the pivot axle; and a pair of locking pawls movably supported at least at one center of rotation disposed on the second, seat-secured articulation part and having tooth segments capable of lockably engaging with the internal-toothed annular member. The latching device further comprises biasing means, preferably in the form of a spring, normally urging the locking pawls toward one another so as to maintain contact with the stop. At normal acceleration values the locking pawls are held under the action of the spring out of engagement with the internal-toothed annular member. Upon exceeding a predetermined high acceleration value, such as during a crash, the inertial weight pivots about the pivot axle so as to move at least one of the tooth segments of the locking pawls, resting in contact on the stop, into locking engagement with the internal-toothed annular member, thereby securing the backrest from undergoing pivotal movement.

A prior art coupling shaft extending between two adjustment fittings disposed on opposite sides of the seat is frequently perceived as decreasing seating comfort. To remedy this disadvantage complicated and expensive solutions are known in which the coupling shaft is moved via toothed gear drives further backward, thus away from the seating area. By using the latching device of the the present invention this problem of the "coupling shaft" can be solved in simple manner for it is no longer required. Moreover, the latching device of the present invention ensures a secure stability of the backrest in the event of a crash.

The latching device of the present invention is not only applicable as replacement for an adjustment fitting but also as reinforcement in the event of a crash by being installed in addition to an adjustment fitting. This application capability is of particular advantage for seats integrated with a belt. Here, the adjustment fitting which otherwise has to be implemented on the belt guidance side to be very strong, can in this case be replaced by an adjustment fitting of normal strength. But it is also possible to replace the adjustment fitting on the belt guidance side by a robust latching device.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
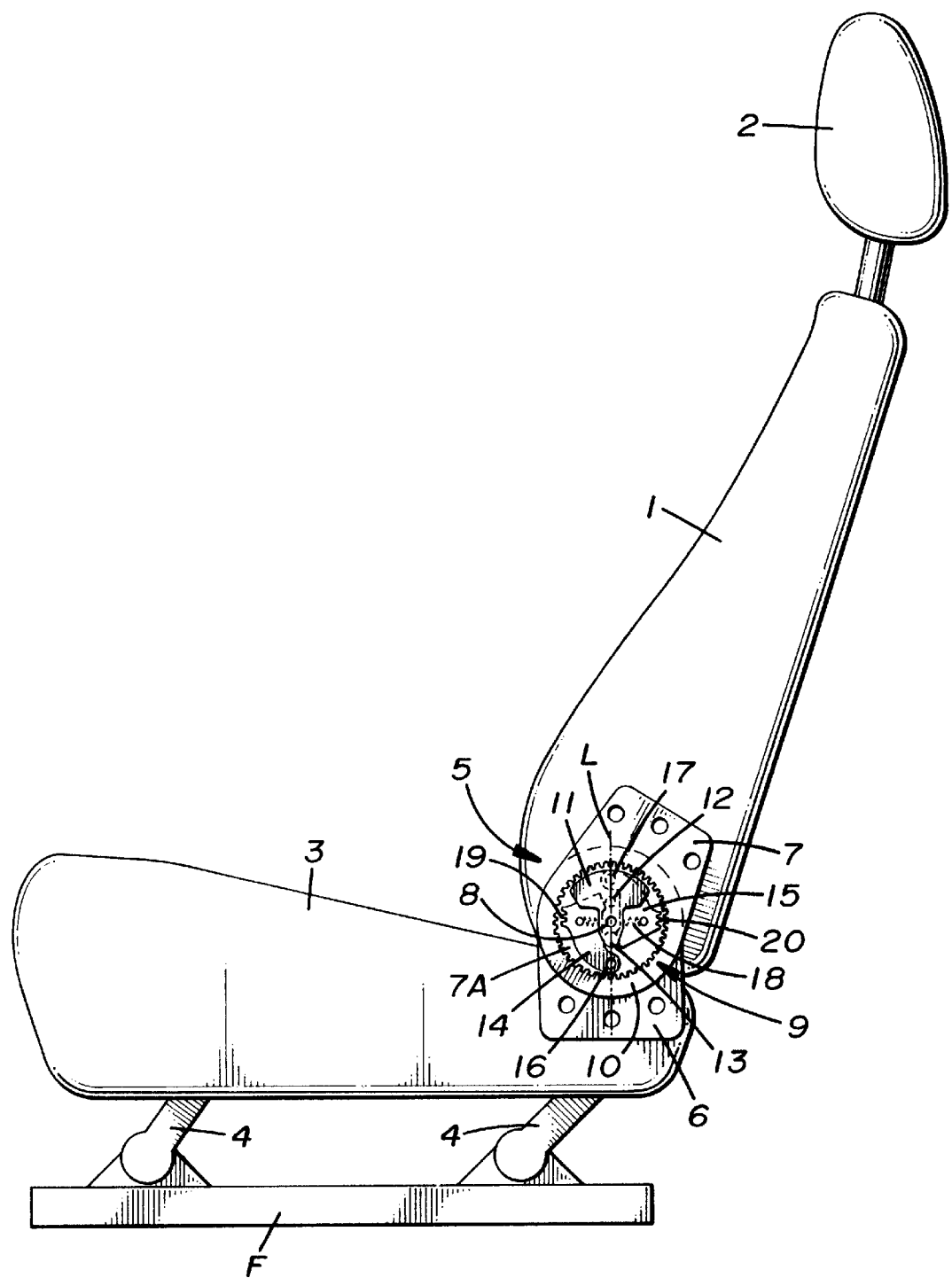
FIG. 1 is a schematic side elevational view of a motor vehicle seat with a first embodiment of a latching device of the present invention installed in the seat in a resting position, i.e. in normal driving condition.

Referring to the drawings and particularly to FIG. 1, there is illustrated a conventional motor vehicle seat having a backrest 1 with headrest 2, and a seat part 3 which is supported via a mounting stand 4 on a floor F of a motor vehicle. The seat part 3 and the backrest 1 are connected via an articulation, generally designated 5.

Figure 2:
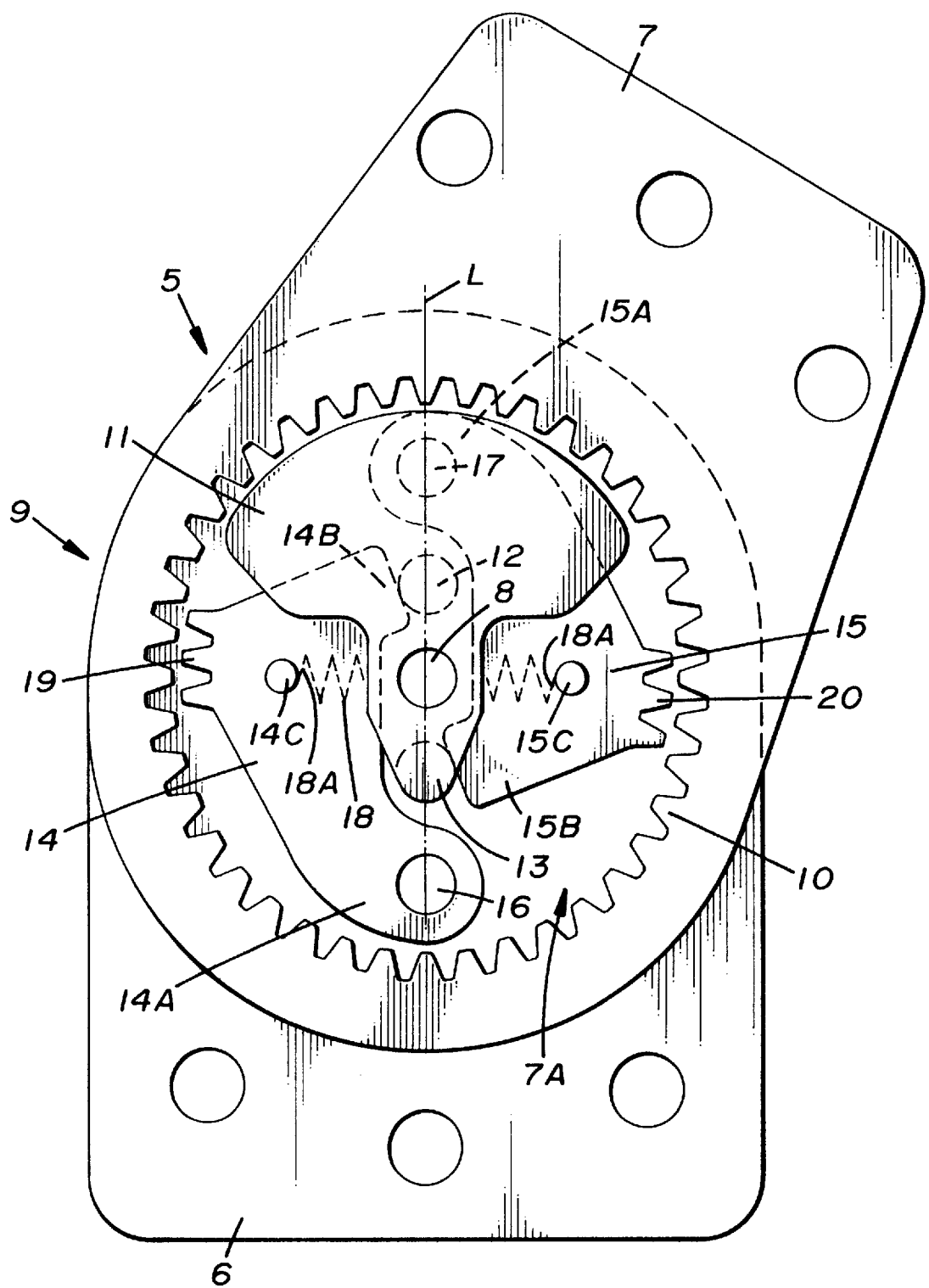
FIG. 2 is an enlarged side elevational view of the latching device shown in FIG. 1.

Referring to FIGS. 1 and 2, the articulation 5 is comprised by a first articulation part in the form of a first plate 6 secured stationarily on the seat part 3, a second articulation part in the form of a second plate 7 secured stationarily on the backrest 1, and a common pivot axle 8 pivotally coupling the first and second plates 6, 7 together. Integrated into the articulation 5 is a first embodiment of a latching device of the present invention, generally designated 9, which replaces the otherwise conventional adjustment fitting on the one seat side depicted in FIG. 1. On the opposing seat side such adjustment fitting is installed as usual in order to be able to adjust the inclination of the backrest 1 relative to the seat part 3, but primarily also to hold it in the depicted inclined position at least during normal driving condition.

Figure 3:
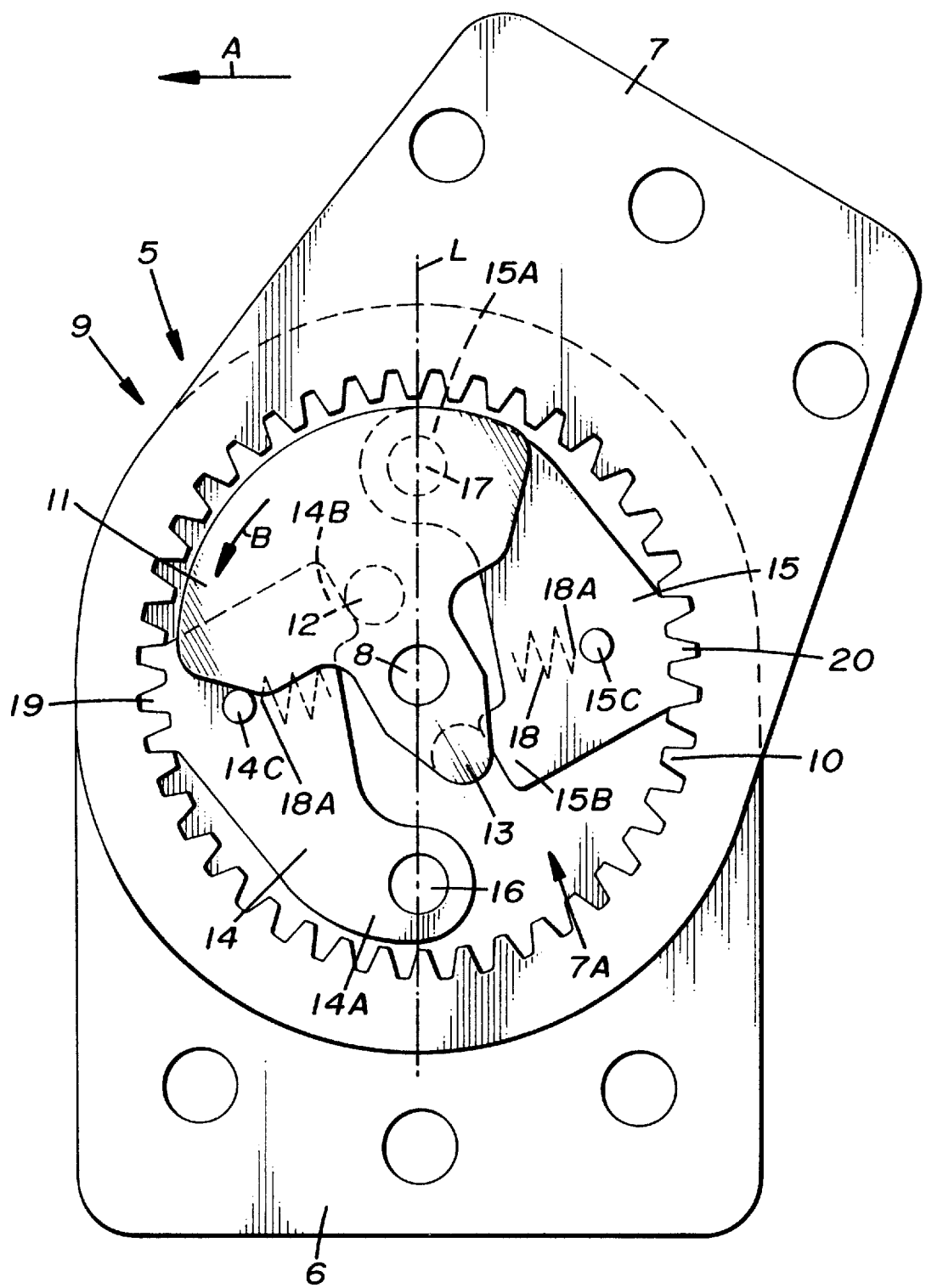
FIG. 3 is a side elevational view of the latching device similar to FIG. 1 but with the latching device shown in a crash position.

The first embodiment of the latching device 9 illustrated in FIGS. 1 to 3 basically includes an internal-toothed ring-shaped annular member 10, an eccentric inertial weight 11, a pair of stops 12, 13, and a pair of locking pawls 14, 15. The second plate 7 of the articulation 5 is provided with an opening or window 7A having an internal edge region which is implemented as the internal-toothed annular member 10. In the center of the internal-toothed annular member 10 is located the pivot axle 8 of the articulation 5. The eccentric inertial weight 11 is hammer-shaped and pivotally supported in an eccentric fashion on the pivot axle 8 so as to be capable of undergoing pivotal pendulum-like movements. The two stops 12, 13 are attached on an inner side of the eccentric inertial weight 11 opposing each other diametrically with respect to the pivot axle 8. The locking pawls 14, 15 at respective first ends 14A, 15A thereof are supported on the first plate 6 of the articulation 5 for pivotal movement about respective centers of rotation 16, 17. The centers of rotation 16, 17 at the first ends 14A, 15B of the locking pawls 14, 15 also oppose one another diametrically to the pivot axle 8. The locking pawls 14, 15 at respective second ends 14B, 15B thereof contact on the stops 12, 13 of the eccentric inertial weight 11. On outer sides of the locking pawls 14, 15 nearer to the second ends 14B, 15B than the first ends 14A, 15A thereof are implemented respective tooth segments 19, 20 which are disposed adjacent to opposing tooth sectors of the internal-toothed annular member 10. Upon pivotal movement of the locking pawls 14, 15 toward and away from one another about their respective centers of rotation 16, 17, the respective tooth segments 19, 20 are engaged with and disengaged from the opposing tooth sectors of the internal-toothed annular member 10. The configuration of the above-described components of the latching device 9 is selected such that in the resting state the centers of rotation 16, 17 of the locking pawls 14, 15, the stops 12, 13 of the inertial weight 11, as well as the pivot axle 8 are on a perpendicular line L, as seen in FIGS. 1 and 2.

The locking pawls 14, 15 are prestressed with respect to one another to tend to move toward one another through action of a biasing force imposed thereon by a spring 18 suspended between the locking pawls 14, 15. The opposite ends 18A of the spring 18 are connected at locations 14C, 15C on the locking pawls 14, 15 in regions thereof adjacent to the respective tooth segments 19, 20 and second ends 14B, 15B of the locking pawls 14, 15, opposing the centers of rotation 16, 17 thereof. The spring 18 is thereby near the second ends 14B, 15B of the locking pawls 14, 15 which make contact with the stops 12, 13 of the eccentric inertial weight 11, with the locking pawl 14 being in contact with the upper stop 12 and the locking pawl 15 being in contact with the lower stop 13. Due to this contact under spring load the eccentric inertial weight 11 under normal driving conditions is counterbalanced in the position shown in FIG. 2 such that its pendulum-like movements are attenuated.

It should be mentioned at this time that the spring 18 is shown in all of the drawing figures for the sake of clarity as broken in the center. In addition to the contact of the locking pawls 14, 15 on the stops 12, 13 of the eccentric inertial weight 11, during normal driving operation of the motor vehicle the spring 18 causes the tooth segments 19, 20 on the outer sides of the locking pawls 14, 15 to remain disengaged from the internal-toothed annular member 10. These tooth segments 19, 20 are disposed at the respective outer sides of the locking pawls 14, 15 remote from the centers of rotation 16, 17 of the locking pawls 14, 15, approximately opposing their second ends 14B, 15B having the surfaces which contact on stops 12, 13 of the eccentric inertial weight 11.

FIG. 3 shows the configuration of the above-described components of the latching device 9 in the event of a collision. Arrow A characterizes the direction of driving of the motor vehicle. The eccentric inertial weight 11 due to a large negative acceleration, for example during a head-on collision, has moved toward the left in the direction of arrow B. The locking pawls 14, 15 maintained in contact on stops 12, 13 by action of spring 18 are thereby pivoted away from one another such that their respective tooth segments 19, 20 become lockably engaged or meshed with the opposing tooth sectors of the internal-toothed annular member 10. The backrest 1 of the seat is thereby secured against pivoting forward. The forces are therein diverted through the structural element chain—of backrest-secured plate 7 with internal-toothed annular member 10; locking pawls 14, 15;

centers of rotation 16, 17; and seat-secured plate 6—from the backrest 1 into the seat part 3 and from there into the motor vehicle floor F.

At a specific adjusted backrest inclination it can occur that the teeth of the tooth segments 19, 20 and of the internal-toothed annular 10 are precisely opposite. The teeth are therefore correspondingly rounded-off at their heads or also pointed which is not evident in the drawing figures.

The representation of the latching device 9 shown in FIG. 2 shows clearly that this latching device 9 is conceived for head-on collisions. In principle, it also is effective in the event of a positive acceleration, thus if, for example, another motor vehicle collides from the rear. However, in this case the lever ratios (distance of center of rotation 16 from the stop 13 or center of rotation 17 from stop 12, respectively) are very unfavorable so that this latching device 9 is hardly or only very little suitable for a rear collision.

Figure 4:
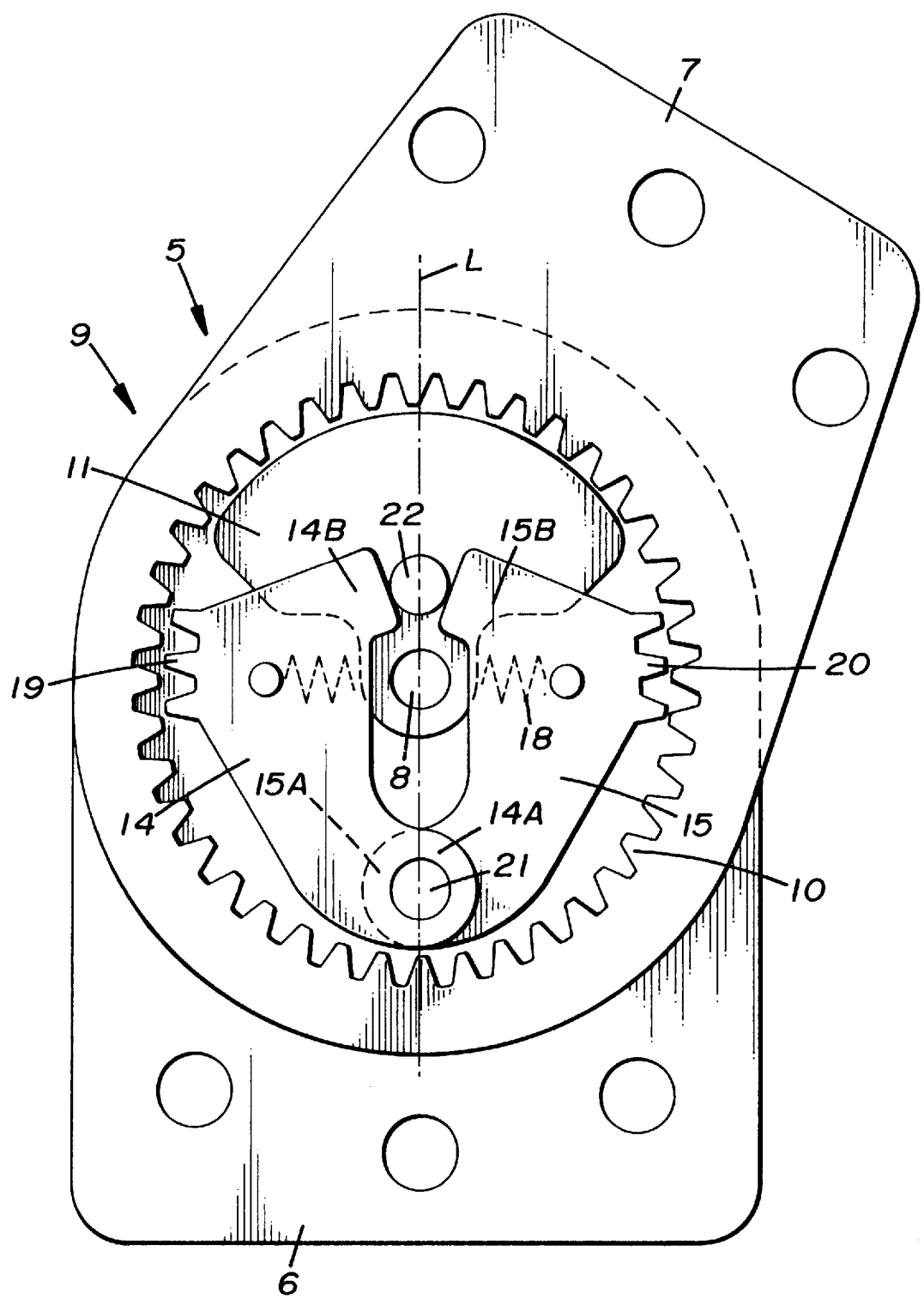
FIG. 4 is a side elevational view of a second embodiment of the latching device of the present invention shown in the resting position.
Figure 5:
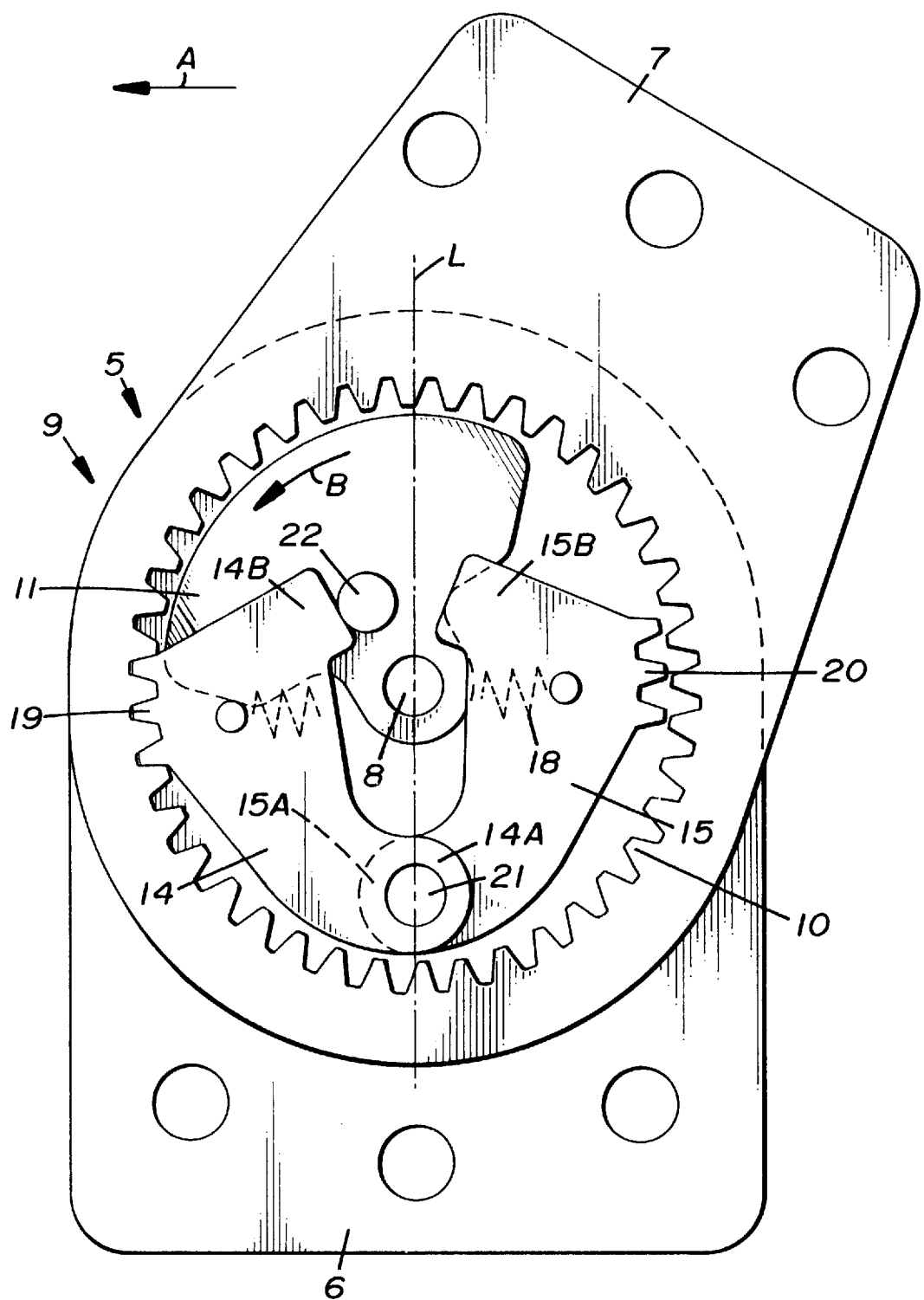
FIG. 5 is a side elevational view of the latching device similar to FIG. 4 but with the latching device shown in one of two possible crash positions.

Referring to FIGS. 4 and 5, a second embodiment of the latching device of the present invention, generally designated 9 also, is shown which is suitable for a head-on as well as also a rear collision. In FIGS. 4 and 5 the same reference symbols are used in connection with the second embodiment of the latching device 9 as were applied to the first embodiment thereof in FIGS. 1 to 3 for identical structural members.

The second embodiment of the latching device 9 of the present invention differs from the preceding first embodiment thereof in that the separate locking pawls 14, 15 at first ends 14A, 15A are supported pivotably on a common center of rotation 21, and in that the locking pawls 14, 15 at second ends 14B, 15B are maintained by action of spring 18 in contact on respective opposite sides of only one stop 22 attached on the eccentric inertial weight 11. In the case of a front-end crash the eccentric inertial weight 11 pivots to the left in the direction of arrow B and with its stop 22 presses the one locking pawl 14 toward the adjacent tooth sector of the internal-toothed annular member 10 such that the tooth segment 19 of the one locking pawl 14 become lockably engaged or meshed with the adjacent tooth sector of the internal-toothed annular member 10, as shown in FIG. 5, thereby securing the backrest 1 of the seat against pivoting forward. During a rear-end crash, the eccentric inertial weight 11 pivots correspondingly to the right as viewed in FIG. 4 and the tooth segment 20 of the other locking pawl 15 becomes lockably engaged or meshed with the adjacent tooth sector of the internal-toothed annular member 10, thereby securing the backrest 1 of the seat against pivoting rearward.

It is thought that the present invention and its advantages will be understood from the foregoing description and it will be apparent that various changes may be made thereto without departing from the spirit and scope of the invention or sacrificing all of its material advantages, the forms hereinbefore described being merely preferred or exemplary embodiments thereof.

I claim:

1. Latching device which locks a pivotal tilt-adjustable backrest of a seat of a motor vehicle against pivotal movement in response to the motor vehicle exceeding a predetermined acceleration value occurring in the longitudinal direction of the motor vehicle, wherein the backrest is connected to a seat part of the seat via a seat articulation having a first articulation part secured stationarily on the seat part, a second articulation part secured stationarily on the backrest and a pivot axle coupling the first and second articulation parts together, said latching device comprising:

(a) an internal-toothed annular member disposed on one of the first and second articulation parts of the seat articulation secured respectively on the seat part and backrest;

(b) an eccentric inertial weight pivotally supported on the pivot axle of the seat articulation;

(c) at least one stop attached on said eccentric inertial weight and spaced from the pivot axle; and (d) a pair of locking pawls each having tooth segments lockably engageable with opposite tooth sectors of said internal-toothed annular member, said locking pawls being movably supported at least at one center of rotation disposed on the other of the first and second articulation part of the seat articulation secured respectively on the seat part and backrest such that said locking pawls can undergo movement between engagement with said stop at normal acceleration values wherein said tooth segments of said locking pawls are disposed out of locking engagement with said internal-toothed annular member to thereby unlock the backrest from the seat part and permit the backrest to undergo pivotal movement relative to the seat part and disengagement from said stop when a predetermined acceleration value is exceeded wherein at least one of said tooth segments of said locking pawls is disposed in locking engagement with said internal-toothed annular member to thereby lock the backrest to the seat part and prevent the backrest from undergoing pivotal movement relative to the seat part.

2. The latching device of claim 1 further comprising a pair of said stops on said eccentric inertial weight opposing each other diametrically with respect to the pivot axle.

3. The latching device of claim 2 wherein said locking pawls at respective first ends thereof are supported on the other of the first and second articulation parts for pivotal movement about respective separate centers of rotation opposing one another diametrically to the pivot axle.

4. The latching device of claim 3 wherein said locking pawls at respective second ends thereof contact said stops of said eccentric inertial weight.

5. The latching device of claim 4 wherein said tooth segments are provided on outer sides of said locking pawls nearer to said respective second ends than to said first ends thereof and adjacent to said opposite tooth sectors of said internal-toothed annular member such that pivotal movement of said locking pawls toward and away from one another about their respective centers of rotation moves said respective tooth segments into engagement with and disengagement from said opposing tooth sectors of said internal-toothed annular member.

6. Latching device which locks a pivotal tilt-adjustable backrest of a seat of a motor vehicle against pivotal movement in response to the motor vehicle exceeding a predetermined acceleration value occurring in the longitudinal direction of the motor vehicle, wherein the backrest is connected to a seat part of the seat via a seat articulation having a first articulation part secured stationarily on the seat part, a second articulation part secured stationarily on the backrest and a pivot axle coupling the first and second articulation parts together, said latching device comprising:

(a) an internal-toothed annular member disposed on one of the first and second articulation parts of the seat articulation secured respectively on the seat part and backrest;

(b) an eccentric inertial weight pivotally supported on the pivot axle of the seat articulation;

(c) at least one stop attached on said eccentric inertial weight and spaced from the pivot axle;

(d) a pair of locking pawls movably supported at least at one center of rotation disposed on the other of the first and second articulation parts of the seat articulation secured respectively on the seat part and backrest, each of said locking pawls having tooth segments capable of lockably engaging with opposite tooth sectors of said internal-toothed annular member; and (e) biasing means for urging said locking pawls toward one another so as to maintain contact with said at least one stop such that at normal acceleration values said tooth segments of said locking pawls are disposed out of engagement with said internal-toothed annular member whereas upon the motor vehicle exceeding the predetermined high acceleration value said eccentric inertial weight pivots about the pivot axle so as to move at least one of said tooth segments of said locking pawls into locking engagement with said internal-toothed annular member and thereby secure the backrest from undergoing pivotal movement relative to the seat part.

7. The latching device of claim 6 wherein said biasing means is a spring attached at opposite ends to and suspended between said locking pawls.

8. The latching device of claim 7 wherein said opposite ends of said spring are connected at locations on said locking pawls adjacent to said respective tooth segments.

9. The latching device of claim 6 wherein:

said eccentric inertial weight is capable of undergoing pendulum-like movements; and said biasing means is coupled between said locking pawls such that said locking pawls via contact with said at least one stop on said eccentric inertial weight apply a load to said eccentric inertial weight that counterbalance and attenuate said pendulum-like movements thereof under normal driving conditions wherein accelerations less than said predetermined acceleration value are encountered.

10. The latching device of claim 9 wherein said biasing means is a spring attached at opposite ends to and suspended between said locking pawls.

11. The latching device of claim 9 wherein said opposite ends of said spring are connected at locations on said locking pawls adjacent to said respective tooth segments.

12. The latching device of claim 6 further comprising a pair of said stops on said eccentric inertial weight opposing each other diametrically with respect to the pivot axle.

13. The latching device of claim 12 wherein said locking pawls at respective first ends thereof are supported on the first articulation part for pivotal movement about respective separate centers of rotation opposing one another diametrically to the pivot axle.

14. The latching device of claim 13 wherein said locking pawls at respective second ends thereof contact said stops of said eccentric inertial weight.

15. The latching device of claim 14 wherein said tooth segments are provided on outer sides of said locking pawls nearer to said respective second ends than to said first ends thereof and adjacent to said opposite tooth sectors of said internal-toothed annular member such that pivotal movement of said locking pawls toward and away from one another about their respective centers of rotation moves said respective tooth segments into engagement with and disengagement from said opposing tooth sectors of said internal-toothed annular member.

* * * * *